United States Patent
Christofferson et al.

(10) Patent No.: US 11,006,184 B2
(45) Date of Patent: May 11, 2021

(54) ENHANCED DISTRIBUTION IMAGE SYSTEM

(71) Applicants: Frank C. Christofferson, Westminster, CO (US); Timothy R. Wahlers, Denver, CO (US)

(72) Inventors: Frank C. Christofferson, Westminster, CO (US); Timothy R. Wahlers, Denver, CO (US)

(73) Assignee: Quantum Radius Corporation, Denver, CO (US)

( * ) Notice: Subject to any disclaimer, the term of this patent is extended or adjusted under 35 U.S.C. 154(b) by 0 days.

(21) Appl. No.: 16/414,778

(22) Filed: May 16, 2019

(65) Prior Publication Data

US 2019/0379944 A1    Dec. 12, 2019

Related U.S. Application Data

(60) Provisional application No. 62/672,528, filed on May 16, 2018.

(51) Int. Cl.
| | |
|---|---|
| *G06F 15/16* | (2006.01) |
| *H04N 21/60* | (2011.01) |
| *G06N 20/00* | (2019.01) |
| *H04L 29/08* | (2006.01) |

(52) U.S. Cl.
CPC ............ *H04N 21/60* (2013.01); *G06N 20/00* (2019.01); *H04L 67/10* (2013.01)

(58) Field of Classification Search
CPC ... H04L 29/08072; H04L 67/10; H04N 21/60; H04N 20/00; G06Q 10/10; G06N 20/00
See application file for complete search history.

(56) References Cited

U.S. PATENT DOCUMENTS

| | | | |
|---|---|---|---|
| 8,947,744 B2 * | 2/2015 | Kurtz | G06K 19/0614 358/3.28 |
| 9,129,258 B2 * | 9/2015 | Alexandrov | G06Q 10/10 |
| 9,647,171 B2 * | 5/2017 | Rogers | H01L 33/54 |
| 9,877,064 B2 * | 1/2018 | Bai | H04N 21/41407 |
| 10,497,084 B2 * | 12/2019 | Appu | G06T 1/20 |
| 2002/0082492 A1 * | 6/2002 | Grzeszczuk | A61B 34/20 600/407 |
| 2012/0162484 A1 * | 6/2012 | Mo | H04N 5/3575 348/241 |
| 2017/0026674 A1 * | 1/2017 | Bai | H04N 21/8456 |
| 2017/0026684 A1 * | 1/2017 | Shan | H04N 21/8455 |
| 2017/0026694 A1 * | 1/2017 | Bai | H04N 21/4307 |
| 2017/0034551 A1 * | 2/2017 | Bai | H04N 21/234309 |
| 2018/0308203 A1 * | 10/2018 | Appu | G06N 3/0454 |
| 2019/0379944 A1 * | 12/2019 | Christofferson | H04N 21/60 |
| 2020/0202980 A1 * | 6/2020 | Salzman | G16B 40/00 |

* cited by examiner

*Primary Examiner* — Khanh Q Dinh
(74) *Attorney, Agent, or Firm* — Clyde R Christofferson, Esq.

(57) ABSTRACT

A system is described for distributing images from a plurality of image capture devices using shared per-pixel parameter definitions for the images over a network of coordinated GPUs, processors, remote IoT devices and services, where minimal information transfer over the network is achieved by using pre-defined quantum states and minimizing serial stages and the coordination over the network is optimized using a machine learning engine.

20 Claims, 2 Drawing Sheets

Invention Network Transfer Applied to Multi-Source Imagery

ENHANCED DISTRIBUTION IMAGE SYSTEM

This application claims the benefit of U.S. Provisional Application 62/672,528 filed on May 16, 2018, the entire contents of which is hereby incorporated by reference as if set forth in full text, including figures.

BACKGROUND OF THE INVENTION

Field of the Invention

The invention describes a method and system for enhancing flexible use of synchronized imagery from multiple sources over a network by optimizing the data representation, sharing and compression of images, sub-images and video via automatable analysis and coordination.

The invention is particularly suited for low-latency distributed combinatorial imagery, such as for Virtual Reality and Augmented Reality (VR/AR) applications. It is intended to be applied to fields as broad as medical imaging, teleoperation and entertainment. The invention takes a novel approach that externalizes and coordinates information that can enhance data compression, optionally employs machine learning methods to further enhance this optimization for a broad and dynamic set of data, and explicitly embraces and expands flexible representations of image pixel information.

Background Description

Communications networks such as the Internet are filled to the brim with bits associated with visual imagery, whether from video and movies, web cameras or rendered content. Some estimates place the percentage of this visual network traffic at over 75% in aggregate, with ongoing and upward trending.

Currently, this data is largely limited to linear streams of imagery that are self-contained, rectangular in nature, and rigorously pre-compressed (for services such as Netflix streaming), or dynamically compressed using widespread standards-based hardware and software such as MPEG or H.265. The current paradigm results in images or video viewed as a rectangle presented on displays such as televisions and smartphones via web browsers or other applications. These data can be replicated for use at multiple destinations and optimized dynamically in a limited fashion for different bit rates or representations, but ultimately sources are images or streams creating single visual, rectangular "pipes" to one or more destinations.

Current compression technology seeks to minimize the quantity of transmitted data by creating an intermediate form that represents that data with a smaller amount of data. The purpose is to reduce the number of bits temporarily during transmission or storage. Reconstruction of the reduced data on the receiving side usually restores the data. Some compression techniques are lossless, allowing complete reconstruction of original data. Others are lossy, entailing tradeoffs that reduce the transmitted data without completely accurate reconstruction of that data.

Compression can be applied to any data. Due to the prevalence and volume on networks of image data as well as the rich field of ergonomic/perceptual optimization of visual data, image compression has garnered much attention. It has inspired many techniques and implementations in products using both optimized hardware and flexible software. Various image compression systems exist in tens of billions of units total worldwide, including all smartphones, personal computers, set-tops, televisions and cameras, and VR/AR eyewear.

A complete image compression system is part of a traditional linear chain involving the creation of a source image asset, compression of that image, transmission of that image, decompression and finally display of the image. Sequences of images entail the same basic process for multiple related images, but may include some analysis of coherence between frames in the sequence. Bi-directional compression systems currently consist of two separate distinct chains, and multidirectional systems include forking and replicating imagery using limited versions of the same chain. Video conferencing and web streaming are examples of these uses.

The most common shorthand to refer to the core compression and decompression steps in this chain is a "codec" (representing "compression/decompression"). Codecs are usually standardized to coordinate use as a limited common "language" between as many devices and services as possible, enhancing optimization by sharing an understanding of what the representation and transformation of data means. There are many different image and video compression technologies, subsets and implementations.

Many visual codecs have evolved for different applications corresponding to different types of imagery, with tradeoffs and optimizations but having general similarity. Some employ multiple techniques which can be used selectively or in concert depending on the application, the characteristics of the imagery and the capabilities of the devices involved. Many techniques are generally useful, and others are specific to certain situations.

There are a variety of systems that employ image codecs. These can range from relatively straightforward digital camera image capture, compression, and storage to content authoring and display systems that use multiple image formats, transcode and filter those formats, and ultimately display images or sequences. Some systems include secondary use of images, such as those embedded as video sequences within other images (such as pictures embedded within other pictures on televisions), or image textures as an asset projected in a 3D rendered scene. Still, each of these involves a fairly standard application of the same chain of capture or synthesis, compression, transmission or storage, decompression, and display.

The vast majority of efforts to improve image compression have focused on techniques that can broadly (and with oversimplification) be described as block and frame methods.

Block optimization methods are where images are broken down into blocks or tiles of sub-images suitable for optimization using methods such as the DCT (Discrete Cosine Transformation). These algorithms seek to process sub-image squares mathematically by determining luminance and chroma thresholds with minimal representations. These square blocks are fairly standard, being currently 8 by 8, 16 by 16 and 64 by 64. These formats target parallelized hardware implementations as well as constrained error rate or accuracy.

Frame methods seek to analyze coherence between adjacent temporal images or motion vectors of subsections intra-image, which often correlate very well in the case of sequences of images in common streaming video (such as an actor moving in a scene, or a baseball game sequence viewed from a single perspective).

Image codec algorithms are mature and well understood. The majority of efforts to optimize codec technology have focused on mathematical and code improvement (in terms of efficiency and accuracy). Most employ digital implementations of analog concepts, such as the cosine transformation or the luminance, chroma and edge frequency characteristics of human visual systems. Many improvements have tuned the use of sub-components such as the codebooks tables used to map approximate values according to the scheme of the codec, effectively allowing pre-computation of some aspects of the algorithm. Some codecs seek fixed bitrates; other are adaptive and may fluctuate in compression rates dynamically.

Although mostly self-contained, some codec systems include limited external and feedback information. For instance, it is common for video transmission services to adapt to feedback from the endpoint on the bandwidth available (which can fluctuate in many cases), allowing dynamic selection of a particular codec or profile (generally resolution or level of compression), or sub portion of an embedded stream. Visual artifacts are commonly introduced in these compromise situations. The challenges of coordination and backward-compatibility for standards-based compression and decompression has limited the flexibility and expansion of external feedback settings.

Currently, the billions of codecs employed in various systems and devices are overwhelmingly developed for and applied to non-real-time environments. For the vast majority of implementations and hence codec technology emphasis, the focus has been compression and cost of implementation (both actual cost and computational complexity), but not rigorous latency.

Latency for these applications is only a concern when the application has a threshold concern. Streaming video services allow buffering and delay measured in seconds or more. Live sports videos tolerate less but still accept significant delay. Video conferencing requires even less delay, but it is still measured above 100 milliseconds. Some specialized short-haul video systems are designed with an emphasis on low latency rather than high compression (such as intermediate video with high fidelity used in production prior to broadcast) but are generally restricted to very limited use and local networks.

The term "low-latency" thus needs clarification. Along with the related term, "real-time", it is a complicated and subjective topic. New applications are appearing such as Virtual Reality which test the limits of human perception in vision and interaction, targeting low millisecond round-trip latency for interaction and display. Given this new metric for real-time and low-latency, almost all currently standardized and fielded codec systems and hardware were not designed nor optimized for low-latency real-time applications, nor new paradigms of highly distributed low-latency network applications.

SUMMARY OF THE INVENTION

Since the inception of film in the late 1800s, the process of creating, distributing and viewing video imagery has involved the same recognizable stages, from camera to display. Today's services such as Netflix create and stream video in a way that would be easily understood by early pioneers of film or broadcast, even adapting from film to radio to Internet packets.

To be sure, many innovations have transpired that have since improved video, in areas such as optics, computation, digital storage, compression, communications, and display. But the basic sequence of pointing a camera and later rebuilding a flickering image is almost identical today.

However, the rise of interactive applications and services in the Cloud finally breaks this pattern. Given the requirement for extreme low-latency needed to match human perception and the need for more dynamic, complex imagery with multiple sources and destinations simultaneously, the old unidirectional, serial multi-stage approach is a hindrance.

A new approach is needed to support highly interactive, largely synthetic, networked applications shared by millions or billions of users. Science Fiction writer Ursula K. Le Guin coined the ideal in the 1960's: Instant image sharing across arbitrary distances to millions of different devices, allowing the creation of advanced interactive communications and services. She called it the "Ansible". This hypothetical solution can be used as inspiration for a new look at the problem and a practical solution that builds a bridge to that ideal future.

Such a solution has several keystones.

Foremost, as little information should traverse the network as possible. Pre-defined "quantum state" should be coordinated wherever possible, reducing or eliminating the need to compress and transfer and buffer much data. For the foreseeable future a hard limit and highest priority must be placed on latency reduction and increased data sharing, even at the expense of reducing bandwidth consumption. The goal for interactive applications is single digit milliseconds in contributed delay, and that goal must be maintained despite increases in data content and image resolution.

Secondly, the vast compute, network and application horsepower evolved for streaming video and browsers needs to be harnessed, but in a new way that overcomes the friction and latencies of the current stream-focused approach and also enables additional parallelization. For example, it is now common for multiple GPUs to be used in render farms in very rigid divide-and-conquer fashion. In contrast, it is a goal of the new solution to enable dynamic, flexible coordination of many thousands of disparate, networked GPUs, processors, remote IoT devices and services in order to create highest fidelity, highest performance interactive applications.

Thirdly, data needs to be exchanged minimally during execution, but appropriate data meaning must be saved while flowing data in multiple directions. This opens the door to more uses, such as advanced dynamic compositing and better interactive remote haptic devices. Currently, image compression reduces the image data discussion to mostly chroma and luminance deconstruction and reconstitution, with heavy emphasis on advanced DCT (Discrete Cosine Transformation) optimization and (latency inducing) inter-frame and spatial analysis. In contrast, modern applications need different data, with more support for alpha channels, depth channels, indices to lighting and textures, scene context, 6DOF (six degree of freedom) data and many conditional pieces of information, and also require many different simultaneous sources and destinations for data.

Fourthly, serial stages in the interactive pipeline must be eliminated wherever possible, particularly where combinatorics of n-way communications of vast amounts of data and functions are involved. In particular, encoding and decoding must be minimized, and an approach that overtly trades off compression for latency efficiency should be employed within the dynamic goals of the system. An approach is needed that embraces massive parallelization and specialization/optimization of image components, as well as business monetization of these content elements, such as licensed LOD (level-of-detail) models, textures, or special effects, with asset chain validation and control as an inherent part of the system.

It should be noted such a solution will likely take advantage of advances in machine intelligence to optimize and automate this coordination in a dynamic environment. It is unlikely such coordination could be executed efficiently without such assistance, and this solution space is tailor-made for the current state of the art in machine learning. This also will enable the system to increase its quality and performance over time.

This invention describes such a system, starting with the core architecture of prior patent application U.S. Ser. No. 15/698,637. Whereas that prior application puts forward a foundational coordinated, distributed view of devices and shared attributes needed to field such a solution, this invention takes the step of orchestrating that architecture. Further, it describes the automated techniques that truly leverage and scale the opportunity presented in that prior architecture.

The core concept in U.S. Ser. No. 15/698,637 is the view of a Virtual Hyperpixel Compression Buffer, used to coordinate all devices and applications sharing portions of imagery. Unlike framed rectangular camera imagery of the past, this views content creation as a highly composited, interactive, dynamic group of objects and pixels, possibly from many sources, each with shared attributes such as shading, depth, transparency, and functions. This "virtual framebuffer" allows a multitude of resources to efficiently contribute to the creation of real-time images.

An example of the advantage of the invention in contrast to current practice relates to use of remote GPU resources. The invention encourages use of GPU farms and even isolated resources by allowing assignment of those resources not just in 2D screen and temporal frame space (as is current practice), but also 3D scene space and arbitrary object space. This is enabled by the ability to coordinate their efforts including by defining appropriate depth and compositing information. Thus, a load-balanced and capability-optimized approach to infinitely complex scenes is possible.

To further this example, a synthetic mountain in a scene can be subdivided in image space as well as object space to process in parallel and hence accelerate its creation. A content creation tool such as Unity and a graphics pipeline tool such as Vulkan would be customized using the invention, maximizing those resources and minimizing the data sent to accomplish the fused image.

To help illuminate and differentiate the invention, an advanced real-world application being implemented by the authors is described briefly, and contrasted with current approaches.

Extreme resolution, eye-tracked displays are needed to reach human visual fidelity. In tandem, content must aim for complexity approaching that of our real world. If both are attained, full human visual and cognitive skills can be leveraged for fields as diverse as entertainment, surgery, construction, and manufacturing among others.

Given this goal, our solution envisions applying thousands of non-identical networked GPU's to drive up to 16 k×16K stereo VR/AR displays targeting a battery powered wireless headset. An Edge server architecture enhanced by additional deep Cloud functions as well as highly local IoT devices will all contribute to this solution. Our invention defines this architecture and provides the possibility of orchestrating this complex system.

Our solution defines each networked resource and their capabilities and attributes, including storage, networking, node latency, service cost and others.

In order to contribute to creation of a low-latency high fidelity frame of interactive imagery, some components of the image will have different (and variable) resolutions (spatially and data density), color palettes, depth resolutions, transparency resolutions, stencil zones, lighting functions, and compositing capability. A pixel in the final image may be shared by multiple resources. As an example, a pixel far from the fovea of the eye-tracking focal point will be optimized differently from the center. GPU's contributing to far depth-elements in the scene will use a different Z-buffer range and offset than foreground components. Time-warped pixels will have different attributes depending on their location. User interface overlays and text will have different bit-depths and palettes. These different settings will be communicated at the beginning of service as well as during processing, guided by prioritized statistical performance and machine learning algorithms.

With current methods, an engineer would start dividing and conquering this challenge, customizing assignment of GPU's, use codecs to compress these subimages, and try to fuse or reassemble them either at the Edge or on the target display device. Current architectures and tools would introduce additional complexity and certainly latency, and would not transcend a single application unless real-time interactivity were completely sacrificed.

In contrast, with the invention a common API (Application Program Interface) would allow virtualization of this process and optimization of each element, including elimination of many compress/decompress stages. It could allow creation of a system that dynamically examined and optimized assignment and sharing of this data.

This invention improves compression, coordination and synchronization of imagery for multiple sources and multiple destinations at low latency. The invention can provide benefit to disparate components or subsystems in a distributed network, from displays to rendering units and compute elements. It also improves efficient use of the network or networks connecting these elements, creating more predictable data patterns and high compression ratios. Novel features such as impedance matching for sub-imagery from different sources, use of variable bit image maps to expand the concept of imagery beyond common rectangular blocks of fixed pixels, association of non-standard data to assist in composition and optimization, and the application of machine learning to analyze, infer and optimize image context and attributes to improve compression and fidelity are beneficial.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
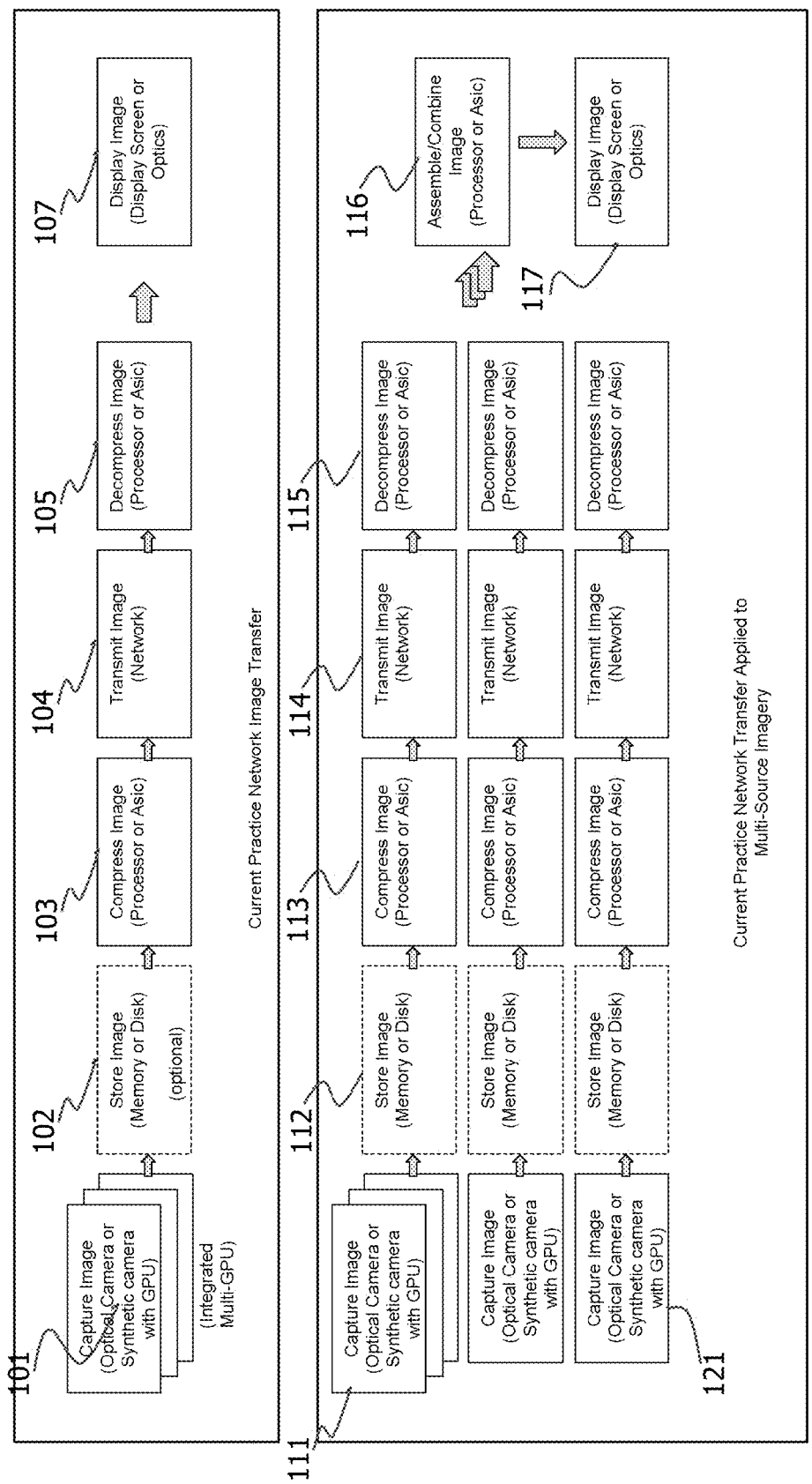
FIG. 1A is a schematic diagram showing current network image transfer practice.
FIG. 1B is a schematic diagram showing current network image transfer practice applied to multi-source imagery.

Current practice in image transfer over a network is shown in FIG. 1A. The image from an integrated multi-GPU capture device 101 is pushed serially through a sequence of (optional) storage 102, compression 103, transmission 104 over the network, decompression 105, and display 107. The same serial sequence is shown in FIG. 1B for imagery from multiple sources: an integrated multi-GPU capture device 111 plus additional image capture devices 121 use (optional) storage 112, compression 113, transmission 114 over the network, decompression 115, assembly and combination of images 116 and display 117.

Figure 2:
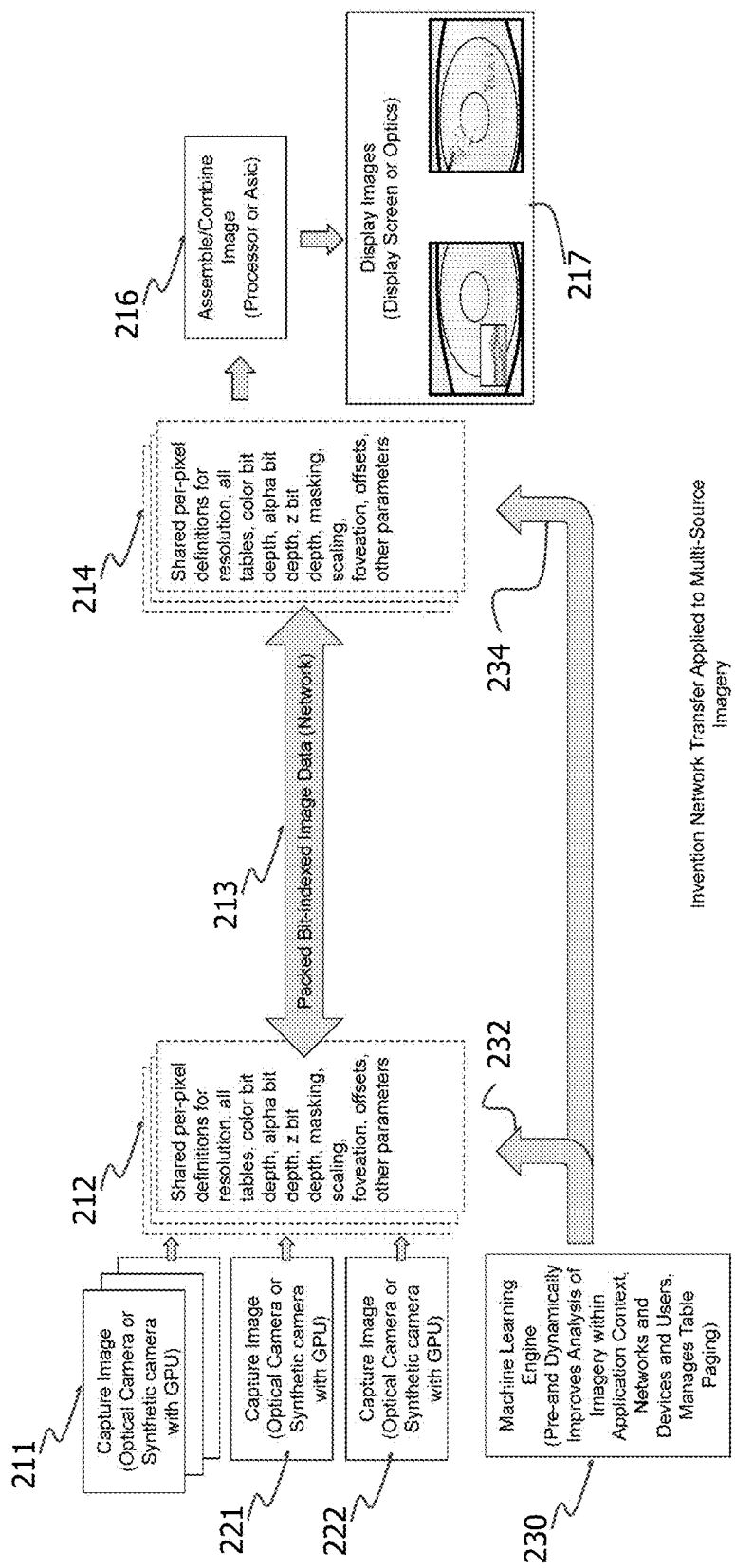
FIG. 2 is a schematic diagram showing network image transfer according to the invention applied to multi-source imagery.

The novel approach of the invention is shown in FIG. 2. Image capture devices 211, 221 and 222 share per-pixel parameter definitions 212 which allow transmission of packed bit-indexed image data over the network 213 where it is received 214 for assembly and combination of images 216 and display 217. A machine learning engine 230 is applied 232, 234 to the shared per-pixel parameter definitions. It should be noted that image capture devices (e.g. 222) can be applied at receipt 214.

The invention is inspired by the robust real-time distributable compression and compositing architecture presented in U.S. patent application Ser. No. 15/698,637, "System and Method for Low Latency Distributed Image Compression and Composition". A critical part of that invention is the representation of a flexible distributed network of variable pixel image components, allowing arbitrary customization and integration of multi-source, multi-component and multi-destination imagery while targeting low-latency transmission and fusion of that image data. Beneficial in its own right and capable of enhancing the current codec ecosystem, the current invention further improves opportunities for compression and coordination of multi-source imagery when combined with new codecs applying the "hyperpixel" concept (referring to that prior patent application's term for expansive and flexible multidimensional data associated with images and component pixels, ranging from traditional (resolution, color, depth, alpha) to more novel metadata and analytically-derived information (such variable resolution, user eye tracked fovea among many others).

The current invention seeks to apply that architecture and expand its use and optimization in a flexible manner, while providing many benefits even to current systems. This invention seeks to broaden and generalize the selection of optimizations used based on a wide variety of source or destination imagery factors, and notably enables analysis and prediction of data not limited to that contained within the current active display chain or image, which contrasts with current solutions.

It is important to emphasize the invention extends consideration of compression optimization to more than traditional thresholding and quantization of chroma and luminance. The invention features use of other image and image context attributes such as depth, transparency, user and device characteristics, data reuse, distributed topology, depth of field and many other factors. This creates the view of an image a living, flexible, multicomponent, multitemporal and multidimensional entity that can be optimized in new ways.

Although the implementations of the invention may be created or guided by humans, the invention specifically enables and is suited for systems which learn and improve over time by applying an automated feedback and training methodology to continuously amass, learn and refine knowledge of large volumes of image analytic data. Any or all of this automation is intended to be replicated and coordinated across distributed components, allowing each to optimize for both its needs and anticipate and coordinate synchronization and optimization of transmission to and from other components.

In contrast to current systems which send compressed imagery from a source, or send instructions to create imagery as in browser-based web rendering instructions, or complex compositing systems, the invention explicitly enables expanded optimization techniques including novel combinations of these types of current techniques.

Compositing alone presents rich opportunities for analysis and optimization, particularly when applied to a distributed environment. In a combinatorial system that enables arbitrary composition of sub-components of imagery (such as foveal zones or overlays, or embedded video streams or certain user interaction components), it is possible and beneficial to apply this invention not only to familiar pixel data, but to meta data and related information. For example, it is possible to influence foveal rendering decisions which ultimately comprise an image, optimizing image parameters or selecting a source of a subimage. Expanding that concept, a local device (such as a small GPU embedded in eyewear) may be better suited at the moment for rendering the inner foveal area, or alternately optimization may suggest an edge device may be better suited. Both situations are possible, and both involve decisions and optimizations affecting both coordination and transmission optimization. Although image compositing is not novel, the invention enables new analysis and tuning of compositing in order to accomplish the goal of optimal low-latency compression.

Another more general example applying the invention are optimizations guided by broader factors such as content creation chains, asset characteristics (such as textures or objects or lighting or special effects) or user characteristics such as color-blindness, or display device characteristics.

It is also possible to dynamically provide feedback loops in or out of band which allow improvement in the usage of these optimizations during preparation or execution. An example would be the positive feedback loop derived from a user's changing physiological parameters, which may be used to optimize the palette or resolution at any and all phases of image creation, processing, sharing and display. Such information could be used immediately (in-band, within the low-latency dynamic palette selection for instance) or used out of band to improve analysis for subsequent optimization.

A minimal implementation of this invention could consist of a shared external optimization database that expands to index multiple applications, users, devices and includes extrapolated or predictive user, application and device behavior that affects visual data construction and display influencing compression optimization and efficient combinatorics of images. This database would form the core of a knowledge base that could be applied for optimization purposes and be augmented and improved and have dynamic (execution-time) components.

Whereas currently compressed image formats (such as PNG or JPEG, or an image sequence cousin such as MPEG or AV1) are self-contained and embed basic descriptions of the resolution, implied or modified color palette, and specific image data that use Red, Green, Blue and Alpha channels, the invention enables persistent external databases associated with applications, images or classes of imagery. Currently, specific applications (such as Netflix) may hold some of this knowledge (such as the selection of optimal current codecs and some codec features for different scenes in a movie), but the invention includes the concept of a generalized, robust, evolving methodology for analyzing, representing and sharing imagery and compression, both a priori and dynamically.

Although the invention embraces nearly infinite feature candidates for analysis optimization, it is specifically not limited to extensive off-line analysis. Elements of optimization could explicitly include and be coordinated and combined with dynamic and distributed real-time optimization methods as well. In contrast, current methods involve very limited versions of preselection of optimization (such as 8-bit or 16-bit color entries regarding color palettes, or application selection of compression targets, or optimal codec sub-component "hints"), or limited dynamic optimization (such as DCT algorithm-based selection of color quantization). Robust external and coordinated multipoint external and dynamic real-time optimization is a key feature of the invention.

It is implied in the invention that multiple representations of the same imagery in a system are possible and not mutually exclusive. This indicates the analysis and optimization may include recognition that certain components in a multipoint system have different, unique or even variable representations and requirements (such as different fidelity for color, resolution, frame update rate, depth buffers, chrominance range, memory buffer specification, and sub- or super-capabilities such as local rendering capacity).

Applying the invention, optimization may include the decision to distribute image compression and sub-construction to various components within the image system. It may also include the decision to distribute or share portions of the source data (such as geometry) used to create any or all of the imagery and include methods to distribute and optimize this data applying known techniques for database distribution. Unlike current application parallelization techniques, this would be motivated and coordinated within the context of overall compression and compositing optimization.

It is also a feature of the invention that a single application or device does not necessarily "own" images, sub-images, pixels or sequences of images. In this view, a process or GPU would not necessarily have sole arbitrage of an image; a multi-access machine-learning image optimization algorithm or database may be shared; a hyperpixel display buffer may be shared. Such a view does not preclude the traditional use of these resources in a restricted or managed "sandbox", such as is the case with virtualized resources, but it also embraces unrestricted usage.

It is explicitly a capability enabled by the invention to distribute the machine learning involved in creating the optimizations themselves. Not only does this enable sharing of computation and specialization of image optimization learning algorithms, but it also allows synchronized "seeded" machine learning for dynamic uses, effectively allowing distributed resources to come to the same compression optimization conclusion and use that feature as a method to minimize shared data with minimal control and data communications.

Applying the invention, even the optimization of compression optimization would be a rich field for improvement. The ultimate intent of the invention is to enable creation of robust, flexible and dynamic methods of application, attribute, media, image and sequence characterization that can autonomously grow and improve over time to assist compression and enhance distributed application of imagery. It is particularly suited but not limited to large, low-latency, distributed, multi-source, multi-endpoint, multi-component imagery systems.

A robust set of application examples will help describe the concept and lead to preferred embodiments of the invention. These are not intended to be limiting examples.

An example applying the invention involves an external distributed color/depth/alpha lookup table system, coordinated with pre-analysis and dynamic image analysis. This would allow employment of a coordinated reduced-complexity imagery codec that transmits images in reduced format via quantization, and then reconstructs at full representation. A flexible implementation of these lookup tables would allow a high dynamic range of pixel colors, depth buffers or alpha transparency to be used to represent imagery while concurrently minimizing the index values (and hence improving compression). The invention is intended to be broadly and flexibly employed, allowing pre-creation of a set of tables that can be communicated amongst the image producers and consumers, applied to sub-sections of imagery or even portions of sequences of imagery. Multiple tables could be optimized, sent, stored and accessed/modified dynamically that allowed a number of reference indices to describe compressed images and allow accurate reconstruction. It would be assumed the tables themselves would be optimized and appropriate for the system employing it, allowing for example a table of full-bit HDR (High Dynamic Range in current nomenclature) lookups consisting of 30 bits of Red, Green and Blue data. One table may be a 7-bit lookup optimization with nonlinear emphasis on a range of hues and chromas, whereas another may be 4-bit representation. One portion of a foveal-focused image may consume one, and the perimeter another. Mechanisms such as mask maps may provide index cues. These are not limiting examples, and the algorithm employed constructing, communicating and applying these tables would be coordinated and flexible.

Although such an external lookup optimization would help enable a minimal bit-depth representation of chroma/luminance/depth/alpha data within images and is in itself a compression optimization, such use does not preclude application of current or new techniques or codecs in concert for further or alternative optimization. A flexible implementation would allow a variety of sub-representations within an image (such as foveal zones or overlays), enhancing the benefits of the invention, and selective use of different current or new codecs for processing.

One motivation for a key application of the invention was the observation that scenes in interactive video games are often artistically based on color theme styles. Thus, a zone in a game such as World of Warcraft or Fortnite uses a consistent green or gold or purple or dusk color palette. It would thus be possible to assess and group tens or even thousands of real-time frames with a group of color lookups that allow greater fidelity in certain portions of the spectrum, and optimization of the lookup table to do this better than prior static tables or limited on-the-fly codec table optimization. Each zone in the game could thus be represented with maximum fidelity as a result of analysis distinct from the separate analysis of each real-time image. The optimal color lookup tables could be prepared and indexed prior to execution and tuned dynamically.

An analysis of the texture maps used in an application could help improve and guide such an example. Known a priori or dynamically, these artistic assets have an influence on the palette used in scenes and may also allow additional inferences regarding desired resolution (such as an analysis of the mipmap structure and limitations).

Similarly, analysis of model attributes such as coloring or shading preferences may provide guidance on optimization.

Application knowledge such as such as day/night lighting could be used to influence and improve these determinations. This could be implemented through application interface or in many cases inferred.

An example non-standard image variable suitable for enhancing coordination and compression optimization is the frame rate on sequences of images, especially among subcomponents. Applying the invention, it is possible to optimize a portion of an image based on the frame rate needed for minimal representation while employing a different rate for other components or the final integrated buffer and display for a particular user. This is the invention's application of impedance matching or temporary transcoding. A specific implementation of this example would consist of a background image portion updated at 15 frames per second (due to the analysis it has a low radial motion component), an antialiased scrolling text projection composited at 60 frames per second, a 90 frame per second foveal area, and a 120 frame per second user interface component. The combined display may smoothly update at the rate of 120 frames per second using the final frame buffer and display, but the components could be analyzed, optimized and represented using the invention.

This impedance method could also be used by applications to enhance functionality beyond linear compositing. For instance, an application could determine it needs to selectively enhance a portion of an image for aesthetic or analytic purposes. An example would be DVR rewind functionality (network or local) associated with the display of a hockey puck. That portion of the image could be separated, enhanced (both in fidelity and temporal update), combined and displayed. Thus it would be possible to provide enhanced resolution and frame rate for a portion of the scene that is most important in a disputed off-sides call, for instance. Similar approaches for use of the invention could improve distributed response in haptic surgery imagery, as another example.

Knowledge of source imagery or destination user and device characteristics may also be applied using the invention to improve compression and representation accuracy. An example would be invoked dithering optimization in the case of combined analysis involving resolution, user abilities, and device characteristics (such as limited available color palette, high or low resolution or a special display mode). The result in this example would be use of a reduced (and hence more compressed) palette and/or resolution to represent an image.

A further example might be or adjustment of image palette to account for and even modify images for color blindness of a user class, also increasing opportunities for improving both perceived fidelity and compression efficiency.

The invention image concept extends the example to optimization of associated depth or transparency (alpha) buffers. Analysis of scenes as well as the structure of display devices or viewer preferences may be used to optimize the selection of variable pixel bit-depth representations and coordinate these amongst endpoints. A specific example would be the conclusion that a peripheral zone in a wide field-of-view image may be represented with fewer (or more) depth bits, whereas a foveal zone may have a different representation. Similarly, horizontal and vertical requirements may differ. The goal of the system would be optimization of shared representation and transmission bits while maintaining fidelity. In this example, dynamic compositing of depth-buffered images from multiple sources at minimum bitrate would be enhanced. Similar application for overlays, or antialiased text representations that are partitioned, shared and combined follows directly from this view of the invention, as do use of alternate image and pixel data such as spatial resolution.

It should be pointed out the invention's approach extends the concept of color table or z-buffer or transparency adjustment and optimization beyond concepts such as fovel-induced concentration or reduction of palette or resolution. In current systems, a preprocessing of shading—such as minimization of red in extra-foveal situations—may affect a codec and hence improve compression. But further application of the invention takes the next step and enables analysis and optimization of variable bit presentation for these pixels, improving the implementation. Applying the hyperpixel concept, it would be possible to apply a highly variable bit structure across the radial span of a wide field of view image, such as 24 bits at the fovea and 3 bits at the edges, with ergonomically or database optimized variance in depth in between.

Another example of optimization applies the knowledge of dead pixels in a display or blank zones in rendered VR/AR scenes. User and device profiles could affect these optimizations and be used globally. If a known display anomaly or feature (such as a cutout or overlay on a largely rectangular smartphone display, or a warp shape in a VR rendering view) is a large class, this shared information could supply a significant source for optimization.

Another example use of the invention would be optimization of distributed image component creation, effectively compressing sent information by overtly optimizing one or more components of images, including where and how they are created and shared. Similar to geometric database replication and sharing, this concept would also specifically enable optional advanced compositing post-processing-like effects such as lens flare. Coordination and optimization of this representation is a key feature. For example, a system implementing the invention may choose to render this effect in one component of the system, distribute that composition, or dynamically mix the two. By flexibly enabling all combinations, optimizations of the amount of data sent or operated on may be reduced. Other effects and sub-components would similarly be optimized. Whereas current content creation and rendering systems may support such concepts, the invention specifically enables this in the context of a low-latency real-time compression and compositing system, and hence the invention could be employed by those systems to improve their performance and flexibility.

Another example of application of invention would be use of distributed eye-tracking information from endpoints for the purpose of image transmission optimization. Used in foveal optimization, such knowledge as eye focal point, optical field, depth of focus and saccadic attributes may be used by the system to provide optimization cues (such as frame rate, resolution, depth buffer optimization, and codec features). This information may be used to not only optimize compression but optimize the representation of sub-components. A user with an ovoid-shaped (as opposed to fixed circular) foveal characteristic may trigger a different optimization for distributed foveal and background rendering. This example may extend beyond spatial area selection, but may influence an inner compression technique, such as a modified DCT algorithm flexible enough to handle general ovoids. Similarly, a user with different head movement, eye movement, or reflexes, may deconstruct into an optimal class for certain features of the distributed system. A fear indicator (pupil size or motion) may provide cues for various image related optimizations or combinatorial image effects throughout the system. The invention generalizes this type of feature for distributed compression and composition optimization.

A variety of psycho-perceptual factors are a rich area for application of the invention. Human internal image processing is a complex and opportunity-rich environment for analysis and optimization. For example, imagery can be manipulated to optimize for inference or extrapolation capabilities of individual humans or classes. This would allow the analytical system to optimize color, resolution, or sub-shape within imagery based on these factors. As a simple example, if a particular human's cognitive-visual system is better at detecting round shapes than boxes, or spheroids verses hard edge cubes, it would suggest an optimization is possible for best representation and transmission of that portion of imagery. The curious field of perception of "flash face distortion effect" for facial imagery may serve as an opportunity for application of the invention for optimization of imagery, as another example.

This approach is not limited to human application of imagery. Synthesis of imagery data for sensors and other image processing machines or training systems would also benefit from most of these interpretations of the scope of the invention. An example would be analysis feeding an IR (infrared) sensor or machine image recognition algorithm as a training image tuned or adapted to its limitations or capabilities. The IR bands suitable for a sensor would imply a reduced or expanded image palette beyond normal human ranges, and hence enables application and device-specific compression optimization. A further related example might skew a palette or resolution portion based on the medical nature of a receiver (human or otherwise), for example emphasizing reds and whites in surgical medical imagery, or very high resolution and lower palettes in portions of compressed x-ray imagery.

Another example of application of the invention would be optimization based on knowledge of the optical depth of field characteristics or the source or destination imagery. Different focal planes, visual zones and distortion provide useful information for optimization.

Another example of application of the invention would be optimization based on knowledge of a factor such as ambient light in one or more destinations. This would potentially skew the color table to improve perception of image features and share that information across the entire network of component-generating and sharing endpoints.

Another non-obvious example would be the inclusion of auditory information from one or more sources in a scene to guide or enhance imagery optimization analysis. Audio characteristics are a known influence on image quality perception.

Another example would analyze cues such as intentional scene direction in a movie, or analysis of focus or intention of the user. If attention is intended to be drawn to one area of a display (such as a character in a movie or advertising), the invention may be applied to coordinate and optimize the imagery and its transmission. This could also apply to important components in a scene, such as the determination a hockey puck and a blue line require higher resolution and fidelity, or signal employment of an enhancement technique dynamically.

Another example application of the invention would be to drive the optimization based on metrics, such as computational cost or energy cost. In this view, pixels and associated information may be viewed as having weight and real value in a way as important as color or depth.

Another instructive example of efficiencies possible with distributed composition applies the invention to relatively common and simple user interface components. In a 3D VR/AR user interface representation, analogs to current window constructs will sometimes be used. If the intent is for the local device, operating system and GPU to manage creation of a 3D window as a part of an image, complete with boundaries, user control interfaces and rendered depth attributes (z-buffer), it will likely be opaque or translucent. If opaque, the boundaries of the window (within a perspective context) would allow a portion of pixels created elsewhere in the distributed image network to be reduced, meaning not rendered or at least not transmitted.

Similarly, if the local controlled window is a 50% transparent semi-occluded overlay, it is likely an acceptable representation of the transparency may allow lower spatial (including depth), chroma and luminance representation of semi-occluded pixels, since the background behind the primary window is intended for effect or secondary context. This breadth of optimization is enabled by the invention.

Further expanding this user interface example is also instructive. If a user interface component consists of translucent 3D user hands used to represent an expanded 3D cursor analog, it may be beneficial to explicitly create that effect or interface on a remote system instead of locally. An example would be where a local renderer may not have the power (computationally or energy-wise) to process more than a crude representation and may benefit from a server creating a higher fidelity representation, as well as perhaps rely on a complex interaction prediction or inference engine. In this situation, the local system may perform basic sensor capture of user hand position and send that data to the server for deeper use and analysis. The resulting image or image component would then be sent to the local display device for image and user interface purposes. The invention encompasses this expansive view of distributed composition and compression optimization.

Another intended use of the invention would be optimal fusion of various imagery in synthetic and real scenes. A more complex example will be instructive and include differentiation from current practice. A VR/AR social application may involve mixtures of rendered geometric avatars and dynamic or preconstructed user imagery, including both pre-generated and dynamic camera imagery, or algorithmic analysis and generation of an analog of a "live" or modified version. A scene with 100 dynamic user avatars may consist of a mixture of all of these, for example with some users choosing to substitute "cosplay" versions or privacy-enhancing versions of themselves (such as modifying imagery as well as voice). This determination may also be made by each endpoint for other reasons such as policy or (as an application of the invention), optimization. The invention enables the composite injection of a highly enhanced transformation from a component service, for example. Thus, a player may select an individualized avatar with superior rendering, or better pre-computation of user features, or custom design, or clothing from an advertiser or virtual item purchase. In current practice, techniques are evolving to perform the mechanics of this rendering within an application (including camera facial capture, pose animation, virtual clothing, etc.), but the optimization of these feature mechanics for the purpose of minimizing low-latency data transmission and enabling maximum multi-source and multi-destination compositing and flexibility is a novelty of the invention.

As with other examples herein, such use could be predetermined, dynamic, or mixed, and used in optimal combinatorial fashion (allowing various rendering and compositing by endpoint devices optimized for different capabilities, system needs or user preferences as determining factors, for instance). These situations can be combined and generalized far beyond simple components and are always possible candidates for analysis and optimization both a priori and dynamically. A system applying the invention would seek to expand and refine knowledge of these situations and dynamically choose various techniques to meet the goal of minimizing pixel transmission and maximizing flexibility of compositing.

While the present invention has been described in terms of particular embodiments and applications, in both summarized and detailed forms, it is not intended that these descriptions in any way limit its scope to any such embodiments and applications, and it will be understood that many substitutions, changes, and variations in the described embodiments, applications and details of the method and system illustrated herein and of their operation can be made by those skilled in the art without departing from the spirit of this invention.

Having thus described our invention, what we claim as new and desire to secure by Letters Patent is as follows:

1. A pixel based system for distributed image composition and compression optimization of an image stream, comprising:
   a plurality of image source and display devices;
   per-pixel parameter definitions for the source images and the display images shared by said plurality of devices;
   a virtual framebuffer for sharing said definitions, so that each of said plurality of devices uses the same definitions for said source images and said display images;
   a network of coordinated devices and services for transfer of information about the source images, either minimal information out of band, including said definitions, or real-time data in band to the display devices, said definitions enabling each pixel in each said source image to be distinctly represented during said real-time in band transfer; and
   a machine learning engine for optimizing said parameter definitions and optimizing said coordination of said network devices and services over the network to reduce latency between source images and display images.

2. A pixel based system for distributed image composition and compression optimization as in claim 1, further comprising:
   a first device for performing a task;
   a second device for performing said task;
   a third device for optimizing performance of said task, said third device effecting said optimization by assigning performance of said task from said first device to said second device, said assignment being communicated via said virtual framebuffer.

3. A pixel based system for distributed image composition and compression optimization as in claim 2, wherein said first device is a local device, said second device is an edge device, and said task is rendering a portion of an image in the image stream.

4. A pixel based system for distributed image composition and compression optimization as in claim 3, wherein the edge device transmits the rendered image portion to the local device for compositing.

5. A pixel based system for distributed image composition and compression optimization as in claim 4, wherein the edge device renders the image portion with higher fidelity than could be provided by the local device.

6. A pixel based system for distributed image composition and compression optimization as in claim 2, further comprising adjusting the presets based on advance knowledge of patterns in the content of the image stream.

7. A pixel based system for distributed image composition and compression optimization as in claim 2, wherein the presets are adjusted to accommodate changes in physiological parameters of a user of the system.

8. In a low-latency image stream virtual compression system without a buffered compression pipeline, wherein a virtual framebuffer enables dynamic coordination of a plurality of source and display devices through shared per-pixel definitions, an improvement comprising:
   optimizing composition of the image stream at a display device by using the virtual framebuffer to coordinate rendering of images in the image stream.

9. A low-latency image stream compression system as in claim 8, wherein images in said image stream are composited from a plurality of sources, said virtual framebuffer assigning each of said plurality of sources a task covering pixels in a portion of the images in said image stream.

10. A low-latency image stream compression system as in claim 9, wherein each of said assigned tasks pertains to a portion of a spatial world whose projection from a viewpoint yields the images in said image stream.

11. A low-latency image stream compression system as in claim 10, wherein presets are used to minimize said image pixels transmitted in real-time.

12. A low-latency image stream compression system as in claim 11, wherein said virtual framebuffer assignments are optimized using a machine learning engine.

13. A low-latency image stream compression system as in claim 12, wherein at least one task in said virtual framebuffer assignments is allocated among two or more of said sources whose work product is transmitted in parallel to said virtual framebuffer.

14. A low-latency image stream compression system as in claim 13, further comprising adjusting the presets based on advance knowledge of patterns in the content of the image stream.

15. A low-latency image stream compression system as in claim 13, further comprising adjusting the presets to accommodate changes in physiological parameters of a user of the system.

16. A low-latency image stream compression system as in claim 15, wherein said accommodation to changes in physiological parameters of a user optimizes a color palette for display to the user.

17. A low-latency image stream compression system as in claim 16, further comprising a shared external optimization database.

18. A low-latency image stream compression system as in claim 8, wherein latency is reduced by combining a plurality of image composition and compression optimization techniques, each of which includes attribute optimizations which are out of band from real-time pixel data.

19. A low-latency image stream compression system as in claim 18, wherein optimization is accomplished by a machine learning engine.

20. A low-latency image stream compression system as in claim 11, wherein operation of the system during a particular time period is optimized by trading off resolution for latency.

* * * * *